United States Patent [19]

Suzuki et al.

[11] 4,077,258

[45] Mar. 7, 1978

[54] METHOD OF DETERMINING LIQUID LEVEL IN A PETROLEUM CRACKING REACTOR

[76] Inventors: Seiichi Suzuki, No. 62-1, Sagiuchi, Nishiki, Iwaki, Fukushima; Masahiro Yamaguchi, No. 55-1, Sekishita, Nishiki, Iwaki, Fukishima; Saburo Takahashi, No. 81-1, Kamata, Nishiki, Iwaki, Fukushima; Keiji Nagayama, No. 167-24, Kubotagozenzaki, Nakoso, Iwaki, Fukushima, all of Japan

[21] Appl. No.: 742,101

[22] Filed: Nov. 16, 1976

[30] Foreign Application Priority Data

Nov. 25, 1975 Japan .............................. 50-140238

[51] Int. Cl.² ........................................... G01F 23/16
[52] U.S. Cl. .................................................... 73/302
[58] Field of Search .................... 73/302, 301, 303; 141/95; 137/386

[56] References Cited

U.S. PATENT DOCUMENTS

| 3,969,942 | 7/1976 | Hope et al. ........................... 73/302 |
| 3,987,815 | 10/1976 | Georgeson ........................ 73/302 X |

FOREIGN PATENT DOCUMENTS

| 1,429,931 | 3/1972 | United Kingdom .................. 73/301 |
| 1,379,554 | 2/1972 | United Kingdom .................. 73/302 |

OTHER PUBLICATIONS

Publication, Chemical Engineers Handbook – J. H. Perry, Ph.D., Editor, Third Edition, 1950, pp. 360, 1289, 1290 and 1437.

*Primary Examiner*—Daniel M. Yasich
*Attorney, Agent, or Firm*—Lane, Aitken, Dunner & Ziems

[57] ABSTRACT

An improved method for determining the liquid level in a petroleum thermal cracking reactor by injecting oil into the reactor at a predetermined rate not less than 5 cm/sec and measuring the liquid pressure at the point of injection and calculating the liquid level from the measured pressure.

1 Claim, 1 Drawing Figure

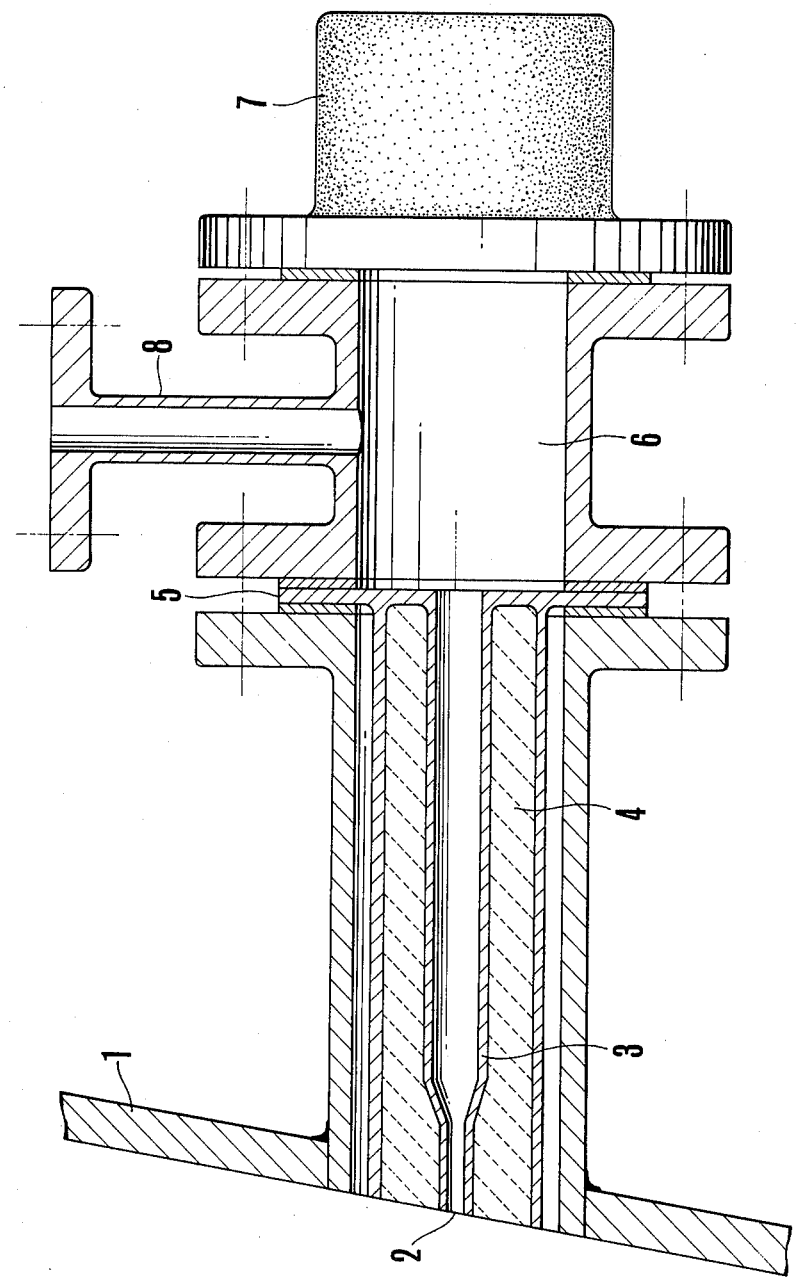

METHOD OF DETERMINING LIQUID LEVEL IN A PETROLEUM CRACKING REACTOR

FIELD OF THE INVENTION

This invention relates to a novel method of determining the liquid level in a reactor when a heavy petroleum oil is subjected to a thermal cracking in the reactor.

BACKGROUND OF THE INVENTION

For determining the level of a liquid material contained in a vessel, there has been prevalently employed a method in which the liquid pressure at a certain fixed point below the liquid level is measured and the liquid level is calculated from the difference between the measured liquid pressure and atmospheric pressure above the liquid level. The level is calculated by dividing the difference in pressure ($\Delta P$) by the liquid density as illustrated, for example, at page 360 of the 1950 Chemical Engineer's Handbook, third edition. However, when this method is employed for determining the liquid level in a reactor in the thermal cracking of heavy petroleum oils such as asphalt, coal tar, heavy oils, etc., it is difficult to measure the liquid pressure at a point below the liquid level, because the content material is of a high temperature on the order of 400° to 500° C and also such material tends to coke. More specifically, when a part of the material is extracted from the reactor through a through-hole provided at a certain location in a side of the reactor and is immediately contacted with a pressure gauge (for example, a diaphragm type pressure gauge), the pressure gauge may be damaged by the high temperature of the material which contacts and heats the pressure gauge, or the through-hole may be blocked by build-up of coke.

SUMMARY OF THE INVENTION

The object of this invention, therefore, is to provide a method which allows determination, in a very simple and advantageous way, of the liquid level in the reactor used for the thermal cracking of heavy petroleum oils.

This and other objects and advantages of this invention will become more apparent from a review of the following detailed description of the invention.

In the course of the study aimed at providing an advantageous method of measuring the liquid pressure at a certain point below the liquid level for determining the liquid level in the reactor, we found that, when heavy petroleum oil is introduced at a certain given rate into the contents in the reactor from a through-hole provided at a certain location in a side of the reactor, instead of extracting a part of the content material as in the above-mentioned known method, it is possible to easily calculate the liquid pressure of the content material at the position of the through-hole from the introducing pressure and the introducing rate.

Thus, according to the present invention, there is provided an improved method for determining the liquid level in a reactor in the thermal cracking of heavy petroleum oil by measuring the liquid pressure at a certain given point below the liquid level. The improved method includes introducing the heavy petroleum oil at a linear velocity of 5 cm/sec or higher into the content material from a through-hole provided at a predetermined location in a side of the reactor while measuring the introducing pressure of the heavy petroleum oil, and calculating the liquid pressure of the content material at the position of the through-hole from the introducing rate and pressure of the heavy petroleum oil.

BRIEF DESCRIPTION OF THE DRAWING

The accompanying drawing is a schematic illustration of a system for practicing the method of this invention.

DETAILED DESCRIPTION OF THE INVENTION

The present invention is now described in detail with reference to the accompanying drawing.

In the drawing, reference numeral 1 designates the outer wall of a reactor, 2 a nozzle, 3 a pipe, 4 castable refractory, 5 a flange, 6 a chamber into which a heavy petroleum oil is introduced, 7 a pressure gauge, and 8 a heavy petroleum oil inlet. The heavy petroleum oil introduced into the chamber 6 is of the same type as the heavy petroleum oil which is subjected to a thermal cracking in the reactor. As for the pressure gauge 7 used in this invention, it is preferable to employ a diaphragm type pressure gauge for operational reasons (The diaphragm type pressure gauge has been considered to be unsuitable for use in the prior art). This pressure gauge 7 is communication with the chamber 6, pipe 3 and nozzle 2.

In practicing the method according to this invention, a heavy petroleum oil is introduced into the chamber 6 through the inlet 8 and then injected into the content material in the reactor at a linear velocity of not less than 5 cm/sec from the nozzle 2, while measuring the introducing pressure. In this case, it is preferable that the heavy petroleum oil introduced into the chamber 6 has a temperature of 150° to 200° C, more definitely a temperature of around 180° C, so as not to exert any undesirable influence on the thermal cracking of the heavy petroleum oil in the reactor. The linear velocity at which the heavy petroleum oil is injected into the content material in the reactor from the nozzle 2 should be not less than 5 cm/sec since the lower linear velocity than 5 cm/sec may cause coking of the oil, resulting in blocking of the nozzle 2. As for the bore of the nozzle 2, too small a bore results in an increased risk of blocking of the nozzle 2 while a too large bore may cause inflow of a large quantity of heavy petroleum oil into the content material in the reactor, adversely affecting the thermal cracking reaction in the reactor, so that the nozzle bore is preferred to be in the range of 5 to 7 mm. In this way, as the rate and pressure at which the heavy petroleum oil is introduced into the content material in the reactor can be determined, it is possible to easily calculate the liquid pressure of the material at the position of the nozzle 2 from and measured values of introducing rate and pressure.

Now, the present invention is described in further detail by way of one embodiment thereof, but it should be understood that the scope of this invention is not limited to this embodiment.

EXAMPLE

A vacuum residue of Khafji crude oil was subjected to a thermal cracking in a reactor at a temperature of 400° to 450° C and at a rate of 300 kg/hr to produce binder pitch. The reactor used here was equipped with a system such as shown in the accompanying drawing. The nozzle bore was 6 mm.

In practicing the thermal cracking, tests were conducted on the method of this invention by varying the linear velocity as shown in the Table below. The test results are also shown in the Table.

| Test No. | Flow rate | Linear velocity | Results |
|---|---|---|---|
| 1 | 3 l/hr | 3 cm/sec | Nozzle aperture was blocked after 40-hour operation to make the system inoperative. |
| 2 | 10 l/hr | 10 cm/sec | Traces of coking in the nozzle aperture were found after 700-hour operation. |
| 3 | 30 l/hr | 30 cm/sec | No coking developed in the nozzle aperture in 2000 hours of operation. |

As apparent from the above Table, the nozzle hole was blocked when the linear velocity was outside the range defined in this invention (Test No. 1), whereas little or no coking took place in the nozzle hole when the linear velocity was within the defined range of this invention (Test Nos. 2 and 3). These facts indicated that long-time normal operation was possible when the linear velocity was set within the range of this invention.

What is claimed is:

1. In a method of determining the liquid level of content material in a reactor in which a heavy petroleum oil is subjected to a thermal cracking, by measuring the liquid pressure at a certain point below said liquid level, the improvement comprising:
   (a) providing chambered means for connection to a through-hole of the reactor for introducing the petroleum oil into the reactor;
   (b) introducing said heavy petroleum oil through said chambered means into said content material at a linear velocity of not less than 5 cm/sec from the through-hole provided at a certain predetermined location in a side of said reactor while measuring the pressure at said through-hole through which said heavy petroleum oil is introduced; and
   (c) calculating the liquid pressure of said content material at the location of said through-hole from the introducing rate and pressure of said heavy petroleum oil.

* * * * *